Patented July 16, 1946

2,403,949

UNITED STATES PATENT OFFICE 2,403,949

RECOVERY OF PURE 3-PICOLINE

George Riethof, Mount Lebanon, Pa., assignor to Pittsburgh Coke & Chemical Company, a corporation of Pennsylvania No Drawing. Application June 30, 1944, Serial No. 543,055

6 Claims. (Cl. 260—290)

This invention relates to the recovery of pure 3-picoline; and, more particularly, it is concerned with a method of isolating 3-picoline in substantially pure form from basic organic oils containing the same.

One of the chief commercial sources of 3-picoline is the basic coal tar oils in which it occurs in admixture with its isomers, 1- and 4-picoline and its homologues, the lutidines. Under normal commercial operations, these basic coal tar oils may be practically fractionated to produce cuts rich in 3-picoline, but it is not practicable by simple fractionation to separate 3-picoline from 4-picoline and 2,6-lutidine. Hence, these three components are generally obtained commercially as an oil boiling about 142–144° C. The product sold commercially as beta-picoline is generally such an oil which may contain 75% or more of 3-picoline and 4-picoline and the remainder mainly 2,6-lutidine.

It is a principal object of this invention to provide an improved process for the isolation of 3-picoline from basic coal tar oils. It is a further object to provide a unique process whereby 3-picoline may be separated from basic oils containing 4-picoline and 2,6-lutidine in such purity that oxidation of the isolated 3-picoline will produce nicotinic acid having a melting point above about 232° C. and as high as 235–237° C. It is a still further object to provide reaction products of ketene with 4-picoline and 2,6-lutidine. Further objects and the entire scope of applicability of the present process will become apparent from the description of the invention given hereinafter.

These objects are accomplished according to the process of the present invention by contacting ketene with basic coal tar oils containing 3-picoline under suitable conditions so as to react the ketene with the components of the oil other than 3-picoline and thereafter isolating the unreacted 3-picoline from the reaction mixture.

The isolation process of this invention is most preferably carried out by slowly bubbling ketene gas through a mass of basic oil containing 3-picoline. Thereafter, the unreacted 3-picoline and other volatile constituents of the reaction mixture, for example, acetic acid, are separated from the reaction mixture by distillation. The volatile materials are then treated with sulphuric acid, or a similar strong mineral acid such as phosphoric acid, in order to convert the 3-picoline to a relatively non-volatile acid salt, and this acid treated component is again distilled to remove its relatively volatile organic constituents. Finally, the undistilled 3-picoline salt is neutralized with a strong base, such as sodium hydroxide, and the 3-picoline is isolated by suitable distillation.

The process of this invention is more fully described in the following illustrative examples, in which all parts are by weight unless otherwise specified.

Example 1

A basic coal tar oil containing approximately 35% of 3-picoline, 40% of 4-picoline, and 25%, by weight of 2,6-lutidine is charged into a suitable reaction vessel. Ketene gas is bubbled through the oil contained in the reaction vessel for a sufficient length of time to complete the reaction of the ketene with the basic oil. The reaction vessel is then vented in order to evolve unreacted ketene. The reaction products are then treated with a small amount of water to effect the hydrolysis of the final traces of ketene remaining. The oil thus obtained is distilled off to 148° C., and the distillate is collected. Concentrated sulphuric acid is added to the distillate in order to form 3-picoline sulphate and the mixture is distilled to separate acetic acid and other volatile organic constituents of the acid treated distillate. The remaining solution of 3-picoline sulphate is neutralized by sodium hydroxide and the pure 3-picoline is isolated by fractional distillation.

Example 2

A basic oil mixture containing about 40% by weight of 3-picoline, 45% of 4-picoline and 15% by weight of 2,6-lutidine is obtained by treating a crude commercial picoline cut with urea according to the process of U. S. Patent No. 2,295,606, which serves to reduce the lutidine content of the basic oil by the isolation of the lutidine from the oil as a urea complex. This concentrated picoline cut is treated in a manner similar to the process of Example 1. The pure 3-picoline thus produced upon oxidation yields nicotinic acid having a melting point about 235° C.

Example 3

A mixture of 1,000 parts of a basic oil containing approximately 45% 3-picoline and 55% 4-picoline is charged into a suitable reaction vessel. To this is added 0.81 part of phosphorus trichloride and then 260 parts of ketene gas are slowly bubbled through the mixture. The remainder of isolation procedure is conducted as outlined in Example 1. The pure 3-picoline which is isolated may be oxidized to nicotinic acid having a melting point about 234–235° C.

The reaction of picoline containing oils with ketene may be effected in any suitable type of apparatus. However, for efficient operation it is desirable to introduce the ketene to the reaction mixture in such a fashion as to assure intimate contact between the ketene and the oil. This can be readily accomplished by introducing the ketene gas into the oil through a suitable porous material such as a sintered glass disc.

The process of the present invention is particularly applicable to crude basic oil mixtures containing 3-picoline and boiling in the range of about 140° C. to 147° C., and, particularly, those oil mixtures composed primarily of 3-picoline, 4-picoline and 2,6-lutidine. However, the process is also applicable to other basic oil mixtures containing an appreciable proportion of 3-picoline in admixture with other alpha and/or gamma methyl-substituted pyridines, such as 2-ethyl-4-methyl pyridine, 2,4,6-trimethyl pyridine, 2-methyl-6-butyl pyridine, and the like.

It has been found that the present process proceeds with greatest efficiency if the basic oil being treated has been concentrated to a suitable degree with respect to its 3-picoline component, i. e., contains in excess of 35% 3-picoline. The most preferable method of accomplishing this is illustrated by the procedure discussed in Example 2 and U. S. Patent No. 2,295,606.

The condensation reaction considered herein is accelerated by various catalytic compounds. The specific catalysts which may be employed for this purpose are those generally referred to in the art as Friedel-Crafts type catalysts. The use of one such compound is illustrated in Example 3 by phosphorus trichloride. Various other compounds which may be employed for this purpose include, boron trifluoride, aluminum trichloride, phosphorus oxychloride, and hydrogen fluoride. These materials are preferably employed in catalytic amounts, i. e., in amounts of the order of 0.01 to one percent by weight of the total reactants.

The term "pure 3-picoline" has been used herein and in the appended claims to designate a product of sufficient purity to yield upon oxidation nicotinic acid having a melting point in excess of 230° C. The method used for oxidation of 3-picoline to nicotinic acid is that described by Pinner, Berichte, 33, page 1226 (1900), with the exception that the nicotinic acid produced is not purified, but is tested for melting point in the form in which it crystallizes from the aqueous solution.

The present invention provides a practical process for the substantially complete recovery of pure 3-picoline from basic organic oils from which it is not commercially possible to recover the 3-picoline by simple physical means, such as fractional distillation. It further provides a unique chemical process for the production of condensation products of ketene and alpha and/or gamma methyl-substituted pyridines which permits 3-picoline to be isolated in the pure state from admixtures with these compounds.

As many wide and varied modifications of the present invention will be apparent to those skilled in the art, it is not intended that the scope of this invention shall be limited except as indicated by the following claims.

I claim:

1. A process for the recovery of pure 3-picoline from basic oil mixtures containing 3-picoline and possessing a boiling point of 140–147° C., which comprises reacting said oil mixture with ketene and thereafter separating unreacted 3-picoline from the reaction mixture.

2. The process for the recovery of pure 3-picoline from basic oil mixtures containing 3-picoline, 4-picoline, and 2,6-lutidine which comprises reacting the 4-picoline and 2,6-lutidine with ketene and separating the unreacted 3-picoline from the reaction mixture.

3. The process for the recovery of pure 3-picoline from basic oil mixtures containing 3-picoline, 4-picoline and 2,6-lutidine which comprises the steps of reacting the 4-picoline and 2,6-lutidine with ketene, distilling off volatile constituents from the reaction mixture, treating the distillate with a strong mineral acid to convert the 3-picoline in the distillate to the salt of said acid, distilling off all volatile organic constituents of said acid treated distillate, neutralizing the remaining 3-picoline salt containing solution, and distilling off and recovering pure 3-picoline.

4. The process of claim 1 wherein said basic oil mixture also contains 4-picoline.

5. The process of claim 1 wherein said reaction is conducted in the presence of a Friedel-Crafts type catalyst.

6. The process of claim 5 wherein said Friedel-Crafts type compound is phosphorus trichloride.

GEORGE RIETHOF.